Figure 1:
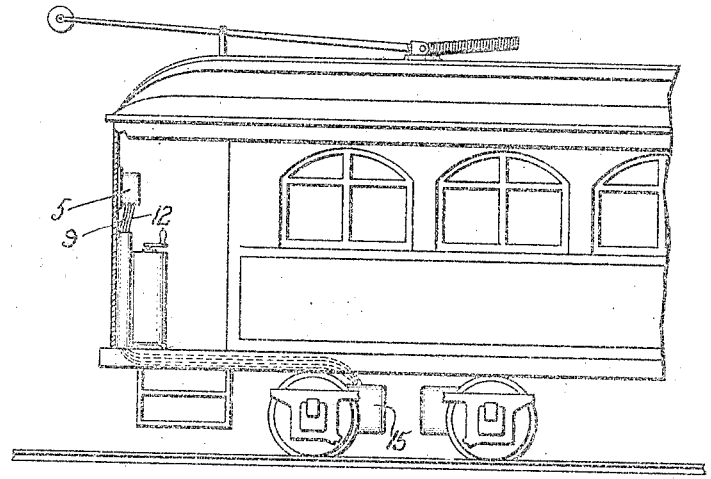

E. F. W. ALEXANDERSON.
METHOD OF AND APPARATUS FOR INDICATING THE SPEED OF ELECTRIC MOTORS.
APPLICATION FILED SEPT. 22, 1909.

1,100,280.

Patented June 16, 1914.

Witnesses:

Inventor:
Ernst F. W. Alexanderson,
by
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

METHOD OF AND APPARATUS FOR INDICATING THE SPEED OF ELECTRIC MOTORS.

1,100,280.  Specification of Letters Patent.  Patented June 16, 1914.

Application filed September 22, 1909. Serial No. 518,983.

*To all whom it may concern:*

Be it known that I, ERNST F. W. ALEXANDERSON, a citizen of the United States, residing at Schenectady, in the county of Schenectady and State of New York, have invented certain new and useful Improvements in Methods of and Apparatus for Indicating the Speed of Electric Motors, of which the following is a specification.

My invention relates to the measurement of the speed of electric motors and of machines driven by electric motors, and its object is to provide a method of and apparatus for electrically indicating the speed of an electric motor, regardless of fluctuations in voltage and current on the supply circuit or of variations in load on the motor, and by means of which the speed of a motor may be accurately determined without any change in the structure of the motor and without any apparatus other than a small electrical indicator.

The fundamental equation of an electric motor having a field and an armature is that the induced counter electromotive force is proportional to the field flux multiplied by the speed of the armature, and since in an alternating current motor the flux at a given frequency is directly proportional to the voltage applied to the field winding, this equation can be changed, in the case of an alternating current motor, to read,—voltage across armature terminals=voltage across field terminals×speed×a constant. From this equation it is clear that the speed is proportional to the voltage across the armature terminals divided by the voltage across the field terminals and hence the relative value of the voltage across the armature terminals and of the voltage across the field terminals will be a correct measure of the speed of the motor, regardless of the voltage impressed on the motor or of variations in the load assuming the armature resistance to be negligible. In accordance with my invention, the relative value of the voltage between the armature terminals and the voltage between the field terminals is indicated by any suitable instrument which responds only to the relative value of said voltages and is not affected by their absolute values.

The principle above described can be used for various purposes in connection with any type of motor having field terminals and armature terminals, but is particularly applicable to alternating current motors in which the flux in the field varies directly with the voltage impressed on the field terminals.

My invention will best be understood in connection with the accompanying drawing which illustrates one of the various forms in which it may be embodied and in which—

Figure 2:
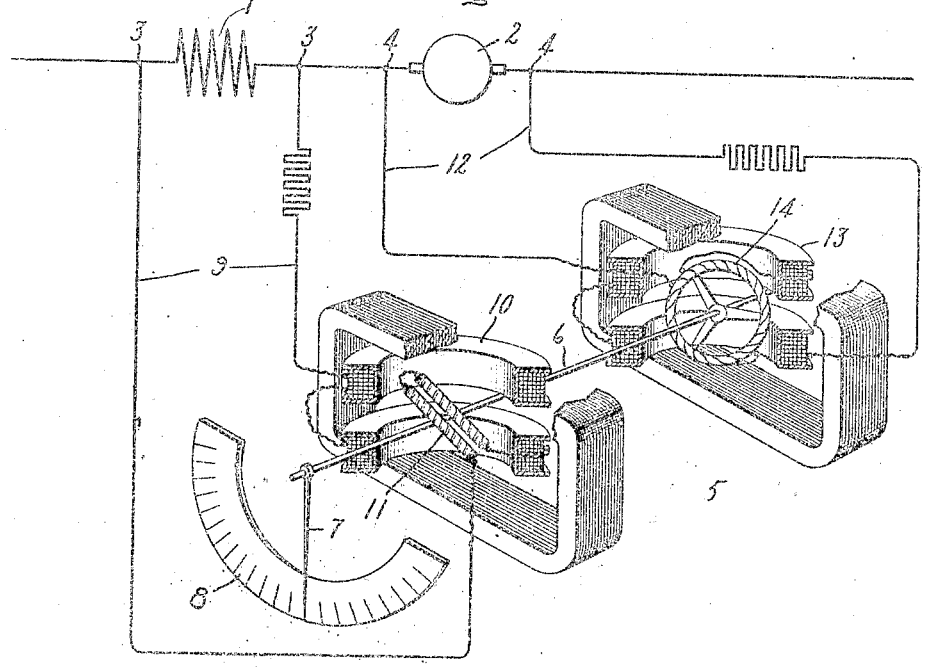

Figure 1 shows a portion of a street car equipped with a speed indicator embodying my invention; and Fig. 2 is a perspective view of the indicator with some parts broken away, the motor and its connections being shown diagrammatically.

In the specific construction shown in the drawing, the relation of the parts is best shown in Fig. 2, in which the motor is represented as having a field winding 1 and an armature 2, the field winding being provided with field terminals 3, while the armature is provided with armature terminals 4. The speed of the motor, and consequently the speed of any device to which the motor is positively connected, may be determined by comparing the voltage across the field terminals 3 with the voltage across the armature terminals 4 and the ratio of one voltage to the other will accurately show the speed of the motor. The manner in which the ratio of the two voltages varies with changes in speed depends upon the extent to which the flux produced by the field winding is directly proportional to the voltage between the field terminals.

The relative values of the voltage between the field terminals 3 and of the voltage between the armature terminals 4 may be determined in any suitable way and by various forms of instruments, but in the preferred construction the relative values of said voltages are continuously and accurately determined by means of a speed indicator 5 provided with a movable member or shaft 6 on which is mounted a pointer 7 to coöperate with a scale 8. The rotation of the shaft or member 6 is unrestrained and the shaft is, therefore, free to rotate into any position where the coils of the instrument may tend to place it. By means of suitable coils or windings a torque dependent upon the voltage between the terminals 3 is exerted on the shaft 6 to turn it in one direction, while at the same time a countertorque dependent on the voltage between the armature terminals 4 is exerted on the shaft 6 to turn it in the other direction. The shaft 6 is unrestrained and its final position depends only upon the relative value of the two voltages and not at all upon their absolute value. Various devices may be used to exert the opposing torques, but in the preferred construction leads 9 connected to the field terminals 3 conduct current through a voltmeter winding comprising stationary coils 10 and movable coils 11 mounted upon the shaft 6, the connections being such that the coils 10 and 11 coöperate to produce a torque in one direction dependent upon the voltage between the terminals 3, while the armature terminals 4 are connected through leads 12 to voltmeter windings consisting of stationary coils 13 and movable coils 14 mounted on the shaft 6 to produce a countertorque which is dependent upon the voltage between the terminals 4. The various coils are connected, through any suitable connection, such as flexible leads which exert no controlling effect, so that the movable member, formed by the shaft 6 and the coils 11 and 14, is capable of unrestrained rotary movement relatively to the stationary ones and can take up any angular position.

The torque developed by coils 11, is a function of the voltage between the terminals 3. For any one position of the coils, the torque is directly proportional to the square of such voltage, and similarly the countertorque developed by coils 14 is for any one position of these coils directly proportional to the square of the voltage across the terminals 4. The coils 11 and 14 are positioned relatively at an angle to each other on a shaft 6. The torque tending to turn coils 11 is for any one position of these coils equal to $V_1^2 f_1$ where $V_1$ is the voltage across the terminals 3—3 and $f_1$ is a certain constant. Similarly, the torque tending to turn the coils 14 is equal to $V_2^2 f_2$ where $V_2$ is the voltage across the terminals 4—4 and $f_2$ is a certain constant. When the indicating pointer 7 comes to rest, the torque tending to turn coils 11 is equal and opposite to the torque tending to turn coils 14. If, for any such position of rest, we represent the torque tending to turn coils 11 by $T_1$ and the torque tending to turn coils 14 by $T_2$, the following equations may be obtained:

$$T_1 = T_2 = V_1^2 f_1 = V_2^2 f_2$$

$$\frac{V_1^2}{V_2^2} = \frac{f_2}{f_1} = k$$

$$\frac{V_1}{V_2} = \sqrt{k} = K$$

It is, therefore, evident that for any one position of the pointer the ratio of the armature voltage to the field voltage is a constant, and accordingly the indication of the pointer 7 will be proportional to the ratio of these voltages. Since this is true for any one position, it is true for all positions, and the speed indicator 5 will, therefore, give an indication of the ratio of the voltage across the armature terminals to the voltage across the field terminals, which ratio may be laid out on the scale 8 in units of speed. As the speed of the motor varies, the ratio of the voltage between the armature terminals to the voltage between the field terminals also varies in accordance with the equation above stated and since the position of the shaft 6 and the pointer 7 is determined by the relative value of said voltages the pointer 7 will move in accordance with the changes in the ratio of said voltages and the shaft 6 and the pointer 7 will assume positions which accurately indicate the speed of the motor regardless of variations of voltage on the circuit, since changes in the absolute value of the voltage applied to the voltmeter windings of the indicator produce no change in the position of the shaft 6 as long as the relative value of said voltages remains constant.

My invention is particularly useful in connection with locomotives or cars driven by alternating current motors and by means of it the speed of the car or locomotive may be easily and accurately indicated with no other apparatus than the indicator 5, since all that is necessary is to connect the indicator to the field terminals and to the armature terminals of the motor. This embodiment of my invention is illustrated in Fig. 1, in which an indicator 5 is mounted on a street car in a position convenient for the motorman and is connected by means of leads 9 and 12 to an alternating current motor 15 which is positively geared to the wheels of the car. The indicator 5 will accurately show the speed of the car regardless of variations of voltage on the line, of changes in the profile of the road, or of any other such circumstances.

My invention may be embodied in other forms than those described and I therefore do not wish to limit myself to the precise arrangement disclosed but aim in the appended claims to cover all modifications within the spirit and scope of my invention.

What I claim as new and desire to secure by Letters Patent of the United States, is:

1. The method of measuring the speed of an electric motor having armature terminals and field terminals which consists in simultaneously measuring and indicating the ratio of the voltage across the armature terminals to the voltage across the field terminals.

2. The method of measuring the speed of an electric motor having armature terminals and field terminals which consists in producing a force which is a function of the voltage across the field terminals and similarly producing another force which is a function of the voltage across the armature terminals, and obtaining from said forces an indication of the ratio of said voltages.

3. The combination with an electric motor having field terminals and armature terminals, of a speed indicator comprising two members rigidly secured to a shaft mounted for rotary movement, and means connected to said terminals to exert two opposing forces which tend to produce rotation of said members in opposite directions, one of said forces being a function of the voltage between the field terminals and the other a function of the voltage between the armature terminals.

4. The combination with an electric motor having field terminals and armature terminals, of a movable indicating member, means for exerting on said member a torque developed by and a function of the voltage between said field terminals and means for exerting on said member a countertorque developed by and a function of the voltage between said armature terminals.

5. The combination with an electric motor having field terminals and armature terminals, of a pivoted indicating member, a winding including a coil secured to said indicating member connected across said field terminals for exerting on said member a torque tending to turn it in one direction, and a second winding including a second coil secured to said indicating member connected across the armature terminals for exerting on said member a countertorque tending to turn it in the opposite direction.

6. The combination with an electric motor having field terminals and armature terminals, of a speed indicator comprising a pivoted indicating member mounted for rotary movement, a voltmeter winding including a coil secured to said indicating member connected across said field terminals and exerting a torque on said member, and a second voltmeter winding including a second coil secured to said indicating member connected across the armature terminals and exerting a counter torque on said member.

7. The combination with an electric motor having field terminals and armature terminals, of a voltmeter winding comprising a fixed and a movable coil connected across the field terminals, a second voltmeter winding comprising a fixed and a movable coil connected across the armature terminals, the movable coils of said voltmeters being so related that they tend to move in opposition to one another, and an unrestrained movable member rigidly secured to each of said movable coils.

In witness whereof, I have hereunto set my hand this 20th day of September, 1909.

ERNST F. W. ALEXANDERSON.

Witnesses:
BENJAMIN B. HULL,
EMMA B. COONS.